(12) United States Patent
Rapp et al.

(10) Patent No.: US 7,562,927 B2
(45) Date of Patent: Jul. 21, 2009

(54) WINDSCREEN WIPER SYSTEM

(75) Inventors: Juergen Rapp, Lauf (DE); Thomas Steimel, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 11/547,661

(22) PCT Filed: Feb. 14, 2005

(86) PCT No.: PCT/EP2005/050644

§ 371 (c)(1),
(2), (4) Date: Oct. 5, 2006

(87) PCT Pub. No.: WO2005/097566

PCT Pub. Date: Oct. 20, 2005

(65) Prior Publication Data

US 2007/0290520 A1    Dec. 20, 2007

(30) Foreign Application Priority Data

Apr. 6, 2004  (DE) .................. 10 2004 016 917

(51) Int. Cl.
*B60J 7/00* (2006.01)
*B60S 1/06* (2006.01)

(52) U.S. Cl. .............. 296/96.15; 15/97.3; 248/900

(58) Field of Classification Search ............. 296/96.15, 296/96.17, 187.04; 15/250.29, 250.44, 250.31, 15/97.3; 248/900; 403/DIG. 3
See application file for complete search history.

(56) References Cited

U.S. PATENT DOCUMENTS 6,422,102 B1   7/2002  Kuehbauch 6,532,616 B1 *  3/2003  Eustache ............. 15/250.31
6,869,126 B2 *  3/2005  Schmid et al. ......... 296/96.15

FOREIGN PATENT DOCUMENTS

| EP | 1033295 A2 | 9/2000 |
| GB | 2 347 340 | 9/2000 |
| JP | 2002234421 | 8/2002 |
| WO | WO 99/43521 | 9/1999 |

* cited by examiner

*Primary Examiner*—Joseph D Pape
(74) *Attorney, Agent, or Firm*—Michael Best & Friedrich LLP

(57) ABSTRACT

The invention relates to a windshield wiper device, in particular for a motor vehicle, with a molded tube (10) that is connected to the bodywork (13) and/or a mounting plate that is connected to the bodywork (13), which is particularly a mounting plate for a wiper motor. The windshield wiper device is located in a region, which is often an impact zone in a collision between a vehicle and a pedestrian. As a result, the components of the windshield wiper device often represent a high risk of injury to pedestrians. The objective of the invention is to improve the windshield wiper device so that the risk of injury to pedestrians is reduced during a collision with the vehicle. In the case of the windshield wiper device in accordance with the invention, the molded tube (10) and/or the mounting plate are detachably fastened to the bodywork (13) in accordance with the invention in such a way that the molded tube (10) and/or the mounting plate can be detached from the bodywork (13) during a collision with the windshield wiper device.

21 Claims, 3 Drawing Sheets

WINDSCREEN WIPER SYSTEM

BACKGROUND OF THE INVENTION

The invention relates to a windshield wiper device, in particular for a motor vehicle, with a molded tube that is connected to the bodywork and/or a mounting plate that is connected to the bodywork, which is particularly a mounting plate for a wiper motor.

Pedestrians are completely unprotected in collisions with vehicles. Particularly the inflexible, hard parts beneath the engine hood often produce severe injuries when a pedestrian collides with a vehicle. The windshield wiper device is located in a region where pedestrians frequently impact a vehicle during a crash. Windshield wiper devices that are generally known from the prior art have the disadvantage that they represent a great risk of injury for the pedestrian in an impact with the vehicle.

SUMMARY OF THE INVENTION

The objective of the invention is improving a windshield wiper device of the type cited at the outset such that in the future the risk of injury to a pedestrian is reduced in an impact with a vehicle.

The invention attains the stated objective with a windshield wiper device of the type cited at the outset, in which, according to the invention, the molded tube and/or the mounting plate are detachably fastened to the bodywork in such a way that the molded tube and/or the mounting plate can be detached from the bodywork during a collision with the windshield wiper device. Because the molded tube and/or the mounting plate are detached from the bodywork when a pedestrian collides with the windshield wiper device, the molded tube and/or the mounting plate can give way during a collision thereby substantially reducing the risk of injury to the pedestrian.

In a development of the invention, the bodywork has a receptacle opening, which is provided with a lateral slot, for accommodating the molded tube or the mounting plate. The molded tube or the mounting plate can be inserted into the receptacle opening for fastening with the bodywork. In the case of an impact with the molded tube or with the mounting plate, the molded plate or the mounting plate will be pressed out of the receptacle opening via the lateral slot and the slot and the receptacle opening will widen in the process. So that the molded tube or the mounting plate is pressed out of the receptacle opening via the slot in a reliable manner, it is expedient if the slot is arranged on the rear edge of the opening as viewed in the effective direction of the impact force. However, it is not absolutely necessary to arrange the slot on the rear edge of the opening as viewed in the effective direction of the impact force in order to guarantee a reliable detachment of the molded tube or of the mounting plate. In addition, the effective direction of the impact force does not have to act parallel to the receptacle opening that is attached to the bodywork in order to reliably detach the molded tube or the mounting plate during an impact. If the impact force acts at an angle between 0 degrees and 90 degrees to the receptacle opening, the molded tube or the mounting plate exerts a sluing motion in the receptacle opening, thereby widening the slot and the receptacle opening, and the molded tube or the mounting plate can detach from the bodywork. Consequently, reliable detachment of the molded part or the plate part from the bodywork is not a function of the effective direction of the impact force. The molded tube or the mounting plate is advantageously pressed so powerfully into the receptacle opening that a further fastening by means of screws or the like is no longer required. As a result, the expense of assembly is considerably reduced.

If the receptacle opening has a flanged edge, the detachment force for detaching the molded tube or the mounting plate can be adjusted by the height of the flanging. In addition, the detachment force is also a function of the thickness of the bodywork panel in the region of the receptacle opening.

Since the detachment process of the molded tube or of the mounting plate requires a certain amount of play for movement of the molded tube or of the mounting plate, it is expedient if the receptacle opening is arranged in a region of the bodywork that protrudes from the bodywork.

In order to be able to insert the molded tube or the mounting plate into the bodywork in an optimal manner, it is advantageous if the molded tube and/or the mounting plate feature a projecting part.

In another embodiment, a sealing element can be provided between the molded tube and the bodywork and/or between the mounting plate and the bodywork. The sealing prevents moisture and dirt from penetrating into the bodywork through the receptacle opening.

So that the sealing element can be arranged between the molded tube and the bodywork and/or between the mounting plate and the bodywork, the sealing element can be inserted into the receptacle opening in the bodywork and the sealing element can also have an opening for accommodating the molded tube or the mounting plate.

In a development of the invention, the sealing element has a circumferential sealing lip pressing against the bodywork. On the one hand, the sealing lip improves the sealing effect of the sealing element, particularly against splashed water, and, on the other hand, it facilitates tolerance equalization between the molded tube and the bodywork or between the mounting plate and the bodywork.

In order to prevent any unwanted slippage of the sealing element out of the molded tube or the mounting plate, the molded tube and/or the mounting plate can have a locking element for fixing the sealing element. A recess is expediently provided in the sealing element so that the locking element can engage in the sealing element.

The mounting plate can have an undulated cross section to increase the rigidity of said mounting plate. The projecting part of the molded tube and the projecting part of the mounting plate can also feature an undulated cross section. In a preferred embodiment, the contour of the receptacle opening can therefore be adapted to the corrugated cross section of the projecting part of the molded tube and/or the corrugated cross section of the projecting part of the mounting plate.

Since the projecting part of the molded tube or of the mounting plate can be inserted into the sealing element, the sealing element can also be adapted to the corrugated cross section of the projecting part. Adapting the sealing element to the corrugated cross section of the projecting part also guarantees that the sealing element has a secure hold on the projecting part.

The sealing effect and tolerance equalization are improved if the sealing element is manufactured from an elastomer.

BRIEF DESCRIPTION OF THE DRAWINGS

Different exemplary embodiments will be described in greater detail in the following on the basis of the enclosed drawings.

The drawings show the following in detail.

DETAILED DESCRIPTION

Figure 1:
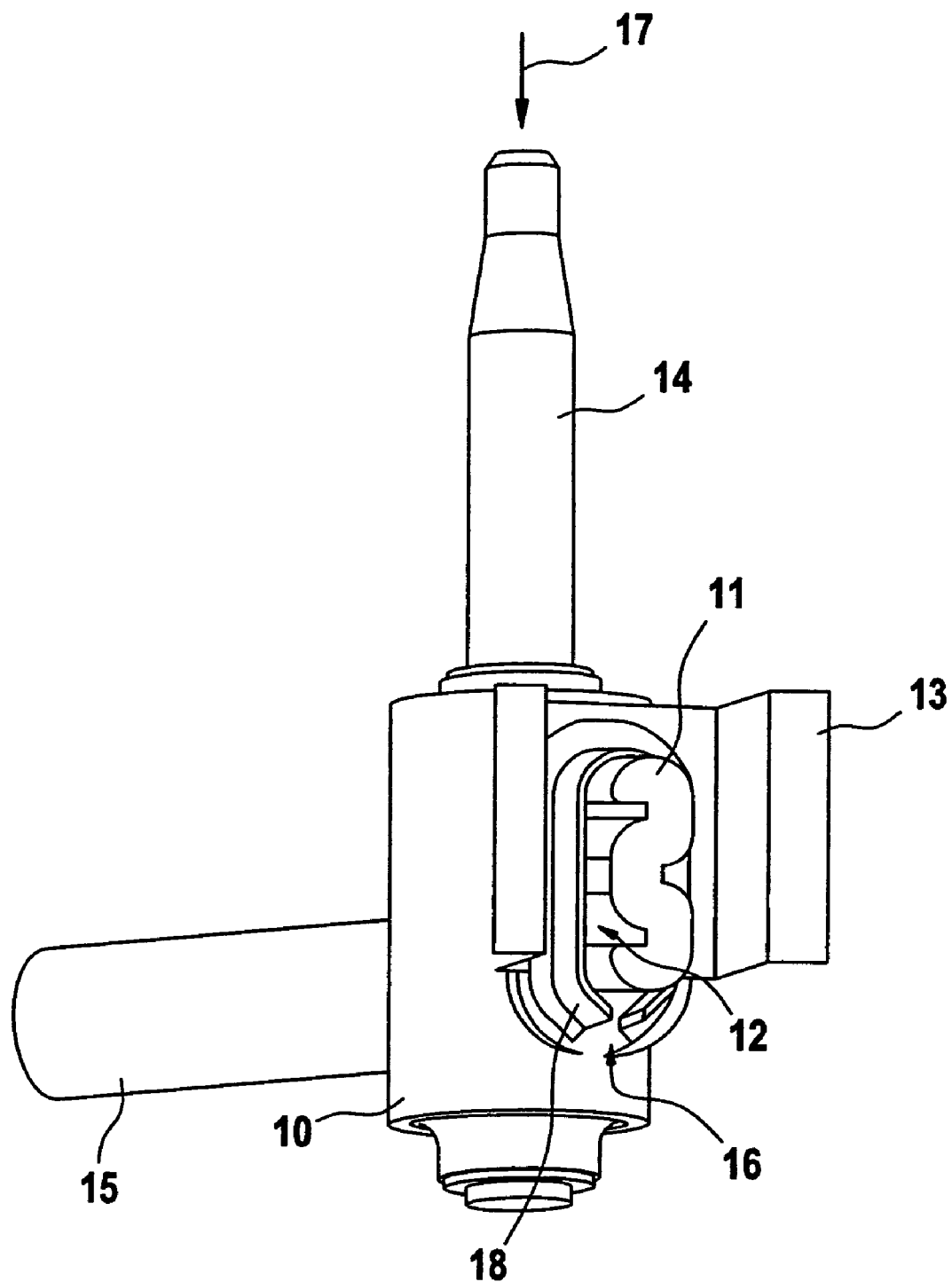
FIG. 1A perspective top view of a molded tube inserted into a bodywork panel.

FIG. 1 shows a molded tube 10 with a projecting part 11. The projecting part 11 is inserted into a receptacle opening 12 of a bodywork 13, of which only a portion is shown here. The molded tube 10 accommodates a wiper shaft 14. In addition, a crimp peg 15 for accommodating a tubular plate (not shown here in more detail) is attached to the molded tube 10. The receptacle opening 12 is provided with a slot 16. When an impact force 17 acts for example on the wiper shaft 14 and the molded tube 10 or via the tubular plate, the crimp peg 15 and the molded tube 10, the projecting part 11 is pressed out of the receptacle opening 12 via the slot 16. As a result, the wiper shaft 14 and the molded tube 10 can yield to the impact force 17, thereby greatly reducing the risk of injury to a colliding pedestrian.

The receptacle opening 12 has a circumferential edge 18. Depending upon the height of the flanging, a detachment force can be adjusted for detaching the molded tube 10. In addition, the detachment force is also a function of the thickness of the sheet metal of the bodywork 13 in the region of the receptacle opening 12.

The receptacle opening 12 is arranged in a region that protrudes from the bodywork 13. As a result, the required play for movement is available to the molded tube 10 for the detachment process from the bodywork 13.

Figure 2:
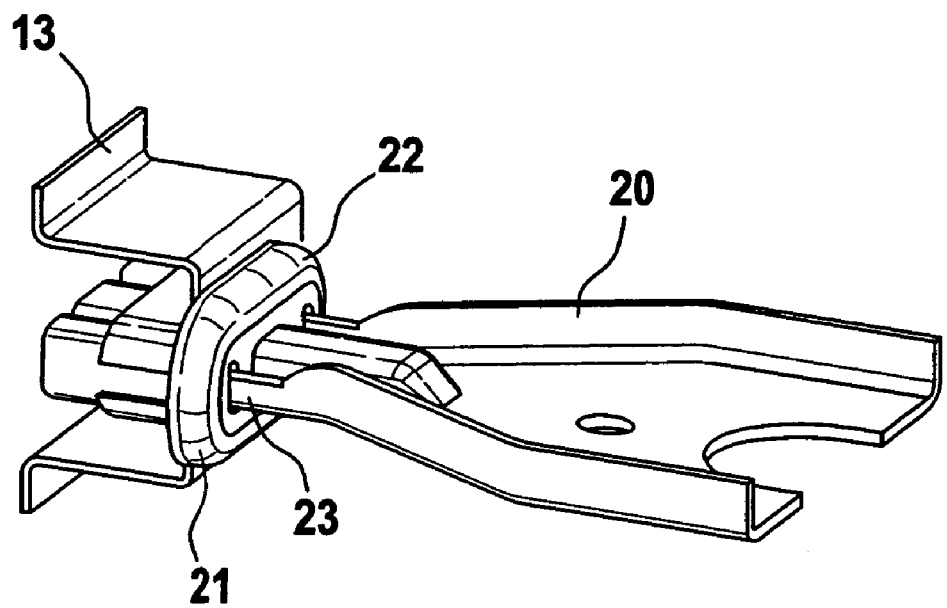
FIG. 2 A perspective top view of a mounting plate inserted into the bodywork panel.

FIG. 2 shows a mounting plate 20, which can be a mounting plate for a wiper motor (not shown here in greater detail). The mounting plate 20 has a projecting part 23, which is inserted into the bodywork 13, of which only a portion is also shown here. A sealing element 21 is arranged between the mounting plate 20 and the bodywork 13 in the region of the projecting part 23. The sealing element 21 is inserted via the projecting part 23 and prevents the undesired penetration of moisture and dirt into the bodywork 13. The sealing element 21 is provided with a circumferential sealing lip 22. The sealing lip 22 improves the sealing effect, in particular against splashed water. In addition, it facilitates tolerance equalization between the mounting plate 20 and the bodywork 13.

Figure 3:
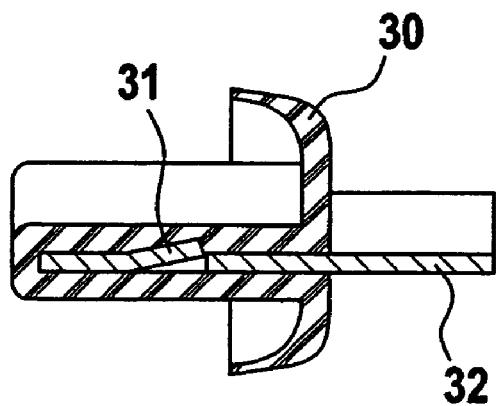
FIG. 3 A longitudinal section through a sealing element.

FIG. 3 depicts a sealing element 30 in which a locking element 31 of a mounting plate 32 can engage. The locking element 31 thereby prevents any unwanted slippage of the sealing element 30 out of the mounting plate 32.

Figure 4:
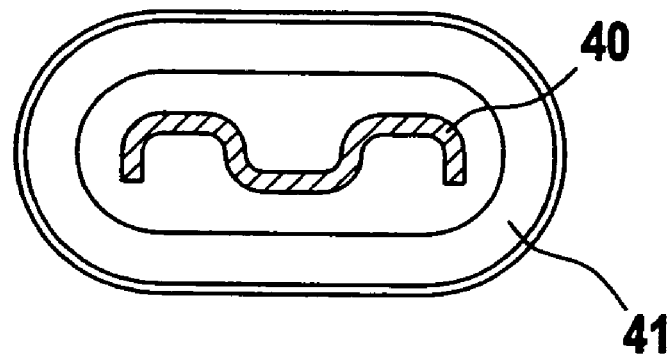
FIG. 4 A top view of the sealing element from FIG. 3.

FIG. 4 shows a mounting plate 40, which has an undulated cross section. The undulated cross section increases the rigidity of the mounting plate 40. The mounting plate 40 is inserted into a sealing element 41. The opening in the sealing element 41 for accommodating the mounting plate 40 is adapted to the undulated cross section of the mounting plate 40. In addition, adapting the sealing element 41 to the corrugated cross section of the mounting plate 40 guarantees a secure hold between the sealing element 41 and the mounting plate 40.

Figure 5:
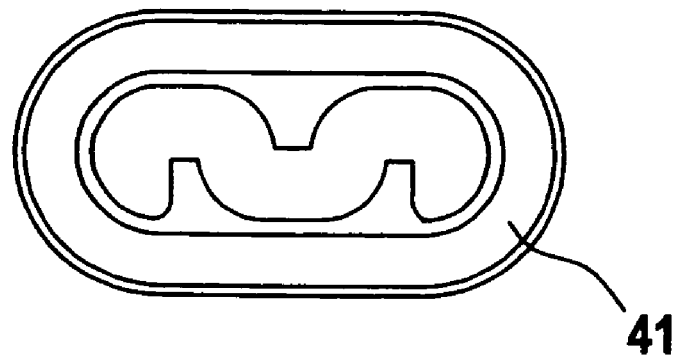
FIG. 5 A top view of the sealing from FIG. 4 from the opposite side.

In order to increase the sealing effect of the sealing element 41, said sealing element is closed on its side opposite from the opening for accommodating the mounting plate 40 (see FIG. 5). As a result, neither moisture nor dirt can penetrate into the bodywork.

The invention claimed is:

1. Windshield wiper device, for a motor vehicle, with a molded tube (10) that is connected to bodywork (13), characterized in that the molded tube (10) is detachably fastened to the bodywork (13) in such a way that the molded tube (10) can be detached from the bodywork (13) during a collision with the windshield wiper device, and characterized in that the bodywork (13) has a receptacle opening (12), which is provided with a lateral slot (16), for accommodating the molded tube (10), and the receptacle opening (12) has a flanged edge (18).

2. Windshield wiper device according to claim 1, characterized in that the receptacle opening (12) is arranged in a region of the bodywork that includes a protrusion.

3. Windshield wiper device according to claim 1, characterized in that the molded tube (10) features a projecting part (11, 23), which can be inserted into a receptacle opening (12) in the bodywork (13).

4. Windshield wiper device according to claim 1, characterized in that a sealing element (21, 30, 41) is provided between the molded tube (10) and the bodywork (13).

5. Windshield wiper device according to claim 4, characterized in that the sealing element (21, 30, 41) has an opening for accommodating the molded tube (10).

6. Windshield wiper device according to claim 4, characterized in that the sealing element (21, 30, 41) has a circumferential sealing lip (22) pressing against the bodywork (13).

7. Windshield wiper device according to claim 4, characterized in that the molded tube (10) has a locking element (31) for fixing the sealing element (30).

8. Windshield wiper device according to claim 1, characterized in that the contour of the receptacle opening (12) is adapted to receive a corrugated cross section of a projecting part (11) of the molded tube (10).

9. Windshield wiper device according to claim 4, characterized in that the sealing element (21, 30, 41) is also coupled to a corrugated cross section of a projecting part (11, 23).

10. Windshield wiper device according to claim 4, characterized in that the sealing element (21, 30, 41) is manufactured from an elastomer.

11. Windshield wiper device, for a motor vehicle, with a mounting plate (20, 32, 40) for a wiper motor that is connected to bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that the bodywork (13) has a receptacle opening (12), which is provided with a lateral slot (16), for accommodating the mounting plate (20, 32, 40).

12. Windshield wiper device according to claim 11, characterized in that the receptacle opening (12) has a flanged edge (18).

13. Windshield wiper device according to claim 11, characterized in that the receptacle opening (12) is arranged in a region of the bodywork that includes a protrusion.

14. Windshield wiper device, for a motor vehicle, with a mounting plate (20, 32, 40) for a wiper motor that is connected to the bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that the mounting plate (20, 32, 40) includes a projecting part (11, 23), which can be inserted into a receptacle opening (12) in the bodywork (13).

15. Windshield wiper device according to claim 11, characterized in that a sealing element (21, 30, 41) is provided between the mounting plate (20, 32, 40) and the bodywork (13).

16. Windshield wiper device, for a motor vehicle, with a mounting plate (20, 32, 40) for a wiper motor that is connected to bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that a sealing element (21, 30, 41) is provided between the mounting plate (20, 32, 40) and the bodywork (13), and the sealing element (21, 30, 41) has an opening for accommodating the mounting plate (20, 32, 40).

17. Windshield wiper device, for a motor vehicle, with a mounting plate (20, 32, 40) for a wiper motor that is connected to bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that a sealing element (21, 30, 41) is provided between the mounting plate (20, 32, 40) and the bodywork (13) and the sealing element (21, 30, 41) has a circumferential sealing lip (22) pressing against the bodywork (13).

18. Windshield wiper device, for a motor vehicle, with a mounting plate (20, 32, 40) for a wiper motor that is connected to bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that a sealing element (21, 30, 41) is provided between the mounting plate (20, 32, 40) and the bodywork (13), and the mounting plate (32) has a locking element (31) for fixing the sealing element (30).

19. Windshield wiper device according to claim 11, characterized in that the contour of the receptacle opening (12) is adapted to receive a corrugated cross section of a projecting part (23) of the mounting plate (20, 32, 40).

20. Windshield wiper device, for a motor vehicle, with a mounting plate (20, 32, 40) for a wiper motor that is connected to bodywork (13), characterized in that the mounting plate (20, 32, 40) is detachably fastened to the bodywork (13) in such a way that the mounting plate (20, 32, 40) can be detached from the bodywork (13) during a collision with the windshield wiper device, and characterized in that a sealing element (21, 30, 41) is provided between the mounting plate (20, 32, 40) and the bodywork (13), and the sealing element (21, 30, 41) is also coupled to a corrugated cross section of a projecting part (11, 23).

21. Windshield wiper device according to claim 15, characterized in that the sealing element (21, 30, 41) is manufactured from an elastomer.

* * * * *